United States Patent [19]

Fulhaber

[11] 4,239,473
[45] Dec. 16, 1980

[54] MANDREL WITH RETRACTABLE SEGMENTS

[75] Inventor: H. Lucien Fulhaber, Cernay, France

[73] Assignee: Papenmeier France Sàrl, Dannemarie, France

[21] Appl. No.: 52,579

[22] Filed: Jun. 27, 1979

[30] Foreign Application Priority Data

Jun. 30, 1978 [FR] France ............................ 78 19709

[51] Int. Cl.² ...................... B29C 17/00; B29D 23/00
[52] U.S. Cl. ................................... 425/392; 425/403; 425/393; 425/DIG. 218; 249/180; 249/184
[58] Field of Search ..... 425/392, 393, 403, DIG. 218; 249/152, 178, 180, 184, 185

[56] References Cited

U.S. PATENT DOCUMENTS

| 721,837 | 3/1903 | Ross | 249/178 |
|---|---|---|---|
| 1,096,047 | 5/1914 | Miller | 249/180 |
| 1,454,189 | 5/1923 | Reistad | 249/180 |
| 3,146,510 | 9/1964 | McCall | 249/178 |
| 3,205,535 | 9/1965 | Messner et al. | 425/393 X |
| 3,732,054 | 5/1973 | Lyng | 425/393 |
| 4,157,372 | 6/1979 | Kyomen | 425/393 X |

Primary Examiner—J. Howard Flint, Jr.
Attorney, Agent, or Firm—Daniel M. Rosen

[57] ABSTRACT

A mandrel for producing connecting sockets at the end of thermoplastic pipes, the mandrel containing a first and a second row of retractable segments and apparatus for actuating these segments. The apparatus comprises a first and a second actuating bush arranged so as to move axially on a central shaft. The segments of the first and second rows of segments are pivotably mounted on bushes by means of parallel, axially displaced joints. Support surfaces, which are orthogonal to the mandrel axis, serve to hold the segments during their radial movement.

13 Claims, 5 Drawing Figures

MANDREL WITH RETRACTABLE SEGMENTS

BACKGROUND OF THE INVENTION

The present invention relates to mandrels for producing connecting sockets at the end of thermoplastic pipes, particularly a mandrel with retractable segments permitting the shaping of an annular groove within a cylindrical pipe.

It is known for the connection of two ends of thermoplastic pipes to plastically shape one end of one pipe, so that the internal diameter is widened to such an extent that it corresponds to or is slightly larger than the external diameter of the other pipe. This method can advantageously be supplemented by an annular groove within the first widened end, which is provided for receiving a gasket.

To this end mandrels with a shaping surface have been constructed whose outer contours correspond to the inner surface of the pipe end to be widened and over which is firstly forcefitted a heat-softened end of a thermoplastic pipe. After cooling and hardening the thermoplastic material it is indispensible to ensure the retraction of the mandrel surfaces which have permitted the construction of the annular groove in order to permit the removal of the thus shaped pipe.

In general the known mandrels with retractable segments can be subdivided into two different categories having two rows of retractable segments which can assume an extended position in which the radially outer surface of the segments of both rows, arranged in alternating manner, form a continuous annular flange which projects radially from the shaping surfaces of the mandrel, and a retracted position in which the distance from the radially outermost surface to the mandrel axis is smaller than the radius of the shaping surfaces, the segments of both rows being axially displaceable, depending on the means used for actuating said first and second retractable segment rows.

There are firstly mandrels in which the retractable segments are pivotally mounted on a shaft which is perpendicular to the mandrel axle. In this case it is simple to move the retractable segments, leading to a simplification of the actuation means and ensuring reliable operation.

However, every point on the radially outer surface of the retractable segments describes a circular arc during the extension and retraction, which makes it impossible to construct annular grooves with a rectangular or some other complicated shape.

In order to obviate the above deficiencies mandrels have been constructed in which the retractable segments are successfully radially and axially moved. To retract the segments the segments of one row are radially retracted and then axially displaced. This displacement then permits the retraction of the second row of segments. In this way it is possible to produce annular grooves with different shapes.

However, in the case of mandrels with retractable segments of this type, the actuating means are very complicated and comprise dovetail guides and cones. This often leads to faulty operation, particularly due to the thermal stressing to which the mandrel is exposed.

SUMMARY OF THE INVENTION

The object of the present invention is to realize a mandrel with retractable segments which makes it possible to radially retract and extend segments, which has simple and space-saving means for actuating and guiding the segments making it possible to produce sockets in which the ratio of reinforcing seam depth to pipe diameter is favourable from a production point of view.

Another object of the invention is to realize a mandrel with retractable segments which can be maintained at a given temperature by means of a heat-transferring liquid.

These objects and others which will appear from the description are achieved according to the present invention with a mandrel with retractable segments, in which between one free end and a mounting flange there is at least a first and second shaping surface, one forming the axial extension of the other, a first and second row of retractable segments which can assume an extended position in which the radially outer surface of the segments of each row, said segments being arranged in alternating manner, form a continuous torus which separates said shaping surfaces, and a retracted position in which the distance between the mandrel axis and its radially outer surface is smaller than the radius of the shaping surfaces. Accordingly the segments of each row are then reciprocally axially displaced further by means for actuating the first and the second row of segments between the extended and the retracted position. The actuating means comprises a first and a second actuating bush located within the first and the second shaping surface respectively and on which each segment of the first and the second row of segments is movably mounted by means of two parallel, axially displaced joints. There are orthogonal support surfaces for holding the retractable segments during their radial movement and means for displacing the first and the second actuating bush respectively.

According to a special embodiment of the present invention a mandrel is provided in which the first shaping surface is carried by a fixed cylinder arranged between the free mandrel end and the retractable segments. A second shaping surface is carried by a slide which is slidingly mounted on the second actuating bush. A spring is fitted under pressure between the slide and the second actuating bush which forces the slide in the direction of the first shaping surface and the second actuating bush in the opposite direction. A limiting means being provided for limiting the movement of the slide in the direction of the first shaping surface and in which the support surfaces are formed on the opposite surfaces of said cylinder and said slide.

The present invention will be explained in greater detail hereinafter with reference to the drawings.

DESCRIPTION OF THE DRAWINGS

Figure 1:
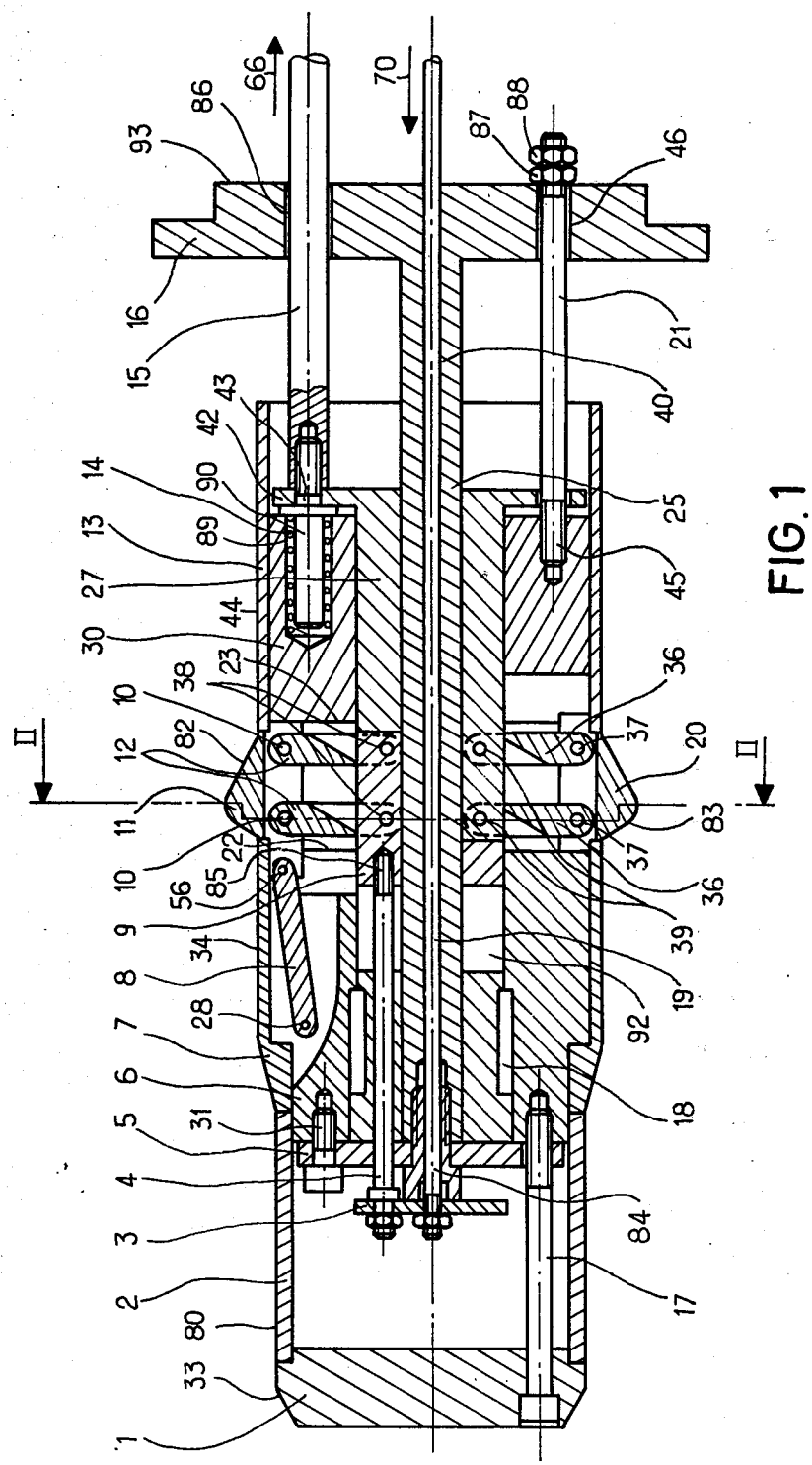
FIG. 1 shows a section along the line I—I of FIG. 2 showing the mandrel with retractable segments in the extended position.

The mandrel according to the invention firstly contains a mounting flange 16 provided for mounting the mandrel on the socket machine and a hollow central shaft or tube 25 fixed to the flange. A mounting plate 5 to which is screwed by means of screws 31 a fixed cylinder 6, is located at the free end of the central shaft. The mandrel end comprises a guide sleeve 2 connected to fixed cylinder 6 by means of a screw 17 and whose outer cylindrical surface 80 has a radius corresponding to the internal radius of the pipe to be shaped. The termination is formed by a cover 1 which is bevelled at 33 in order to facilitate the sliding of the pipe onto the mandrel.

The fixed cylinder 6 carries a first shaping surface 34, which is fixed and cylindrical and whose external diameter corresponds to the desired internal diameter for the shaped zone of the pipe end to be socketed.

The mandrel according to the present invention also has two rows of retractable segments 11 and 20. The radially outer surface 82 or 83 of said retractable segments corresponds to the desired reinforcing seam configuration and in the extended position shown in FIG. 1 the segments of the first row 11 are arranged around the mandrel, alternating with the segments of the second row 20, as is apparent from FIG. 2, so that a continuous torus is formed which bounds the first shaping surface 34.

Preferably to facilitate the positioning of the segments of the different rows, lateral surfaces 35 are provided thereupon which converge towards the inside of the mandrel for the segments of the first row 11 and diverge for the segments of the second row 20. Two joints or links 12 and 36, displaced in parallel and axial manner, are pivotably mounted on the one hand on each retractable segment 11 and 20 by means of pins 10 and 37 and on the other hand on a first or second actuating bush 9 and 27 by means of pins 38 and 39.

The actuating bush 9 is actuated by means of a central actuating rod 19 which can move axially in the bore 40 of the hollow central shaft or tube 25 and the flange 16, the end 84 opposite to the end projecting from flange 16 is connected by means of a disk 3 to one of the ends of at least one transmission rod 4, whose second end 85 is screwed into the first actuating bush 9. The second actuating bush 27 is actuated by at least one offset rod 15 which can be axially displaced in a bore 86 of flange 16. One end of rod 15 projects from flange 16, while the other end with a shoulder 42 is connected in fixed manner to the second actuating bush 27 by means of a screw 43.

Figure 2:
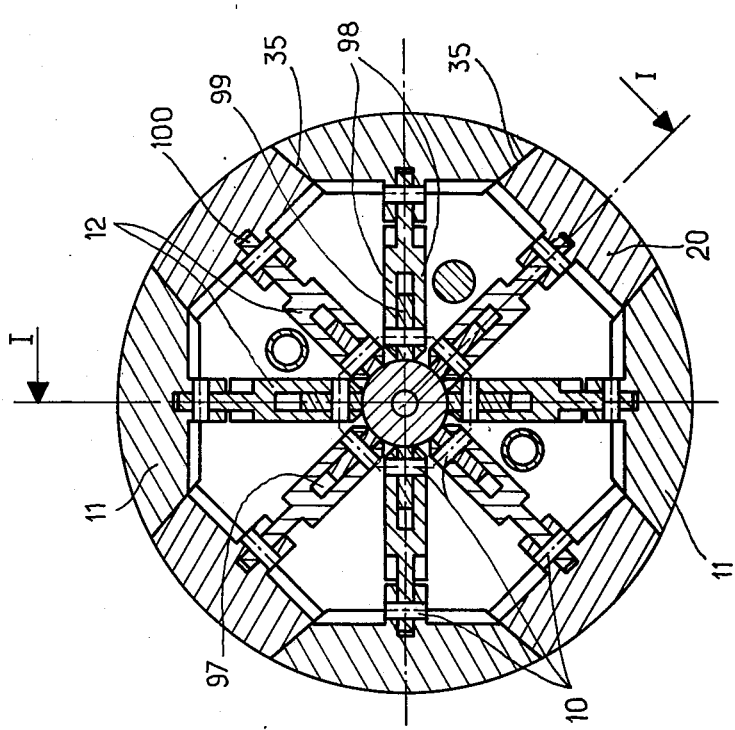
FIG. 2 shows a section along the line II—II of FIG. 1.

A slide 30 which can be moved on the actuating bush 27 carries a second shaping surface 44 which, in the embodiment of FIG. 1, is connected in fixed manner to slide 30. The outer periphery of the second shaping surface is cylindrical and has the same diameter as the shaping surface 34. A spring 14, fitted under pressure between slide 30 and actuating bush 27 forces the slide 30 in the direction of the first shaping surface 34 and the second actuating bush 27 in the opposite direction.

A rod 21 parallel to the mandrel axis and whose one end 45 is screwed into slide 30 and whose other end passes freely through a bore 46 of flange 16 and carries a nut 87 with lock nuts 88 for adjustment purposes serves to limit the movement of slide 30 in the direction of the first shaping surface 34.

Preferably a compression spring 14 is located in a bore 89 of slide 30 formed in the extension of the fastening screw 43 of the offset rod 15 on shoulder 42 of the second actuating bush 27, and axial extension 90 of said screw serving to guide and hold the coils of spring 14.

In the extended position of the retractable segments shown in FIG. 1 the second shaping surface 44 is arranged in the extension of the outer periphery of the retractable segments. The periphery forms a continuous sleeve with the shaping surfaces 34 and 44 of the mandrel.

The opposite surfaces of the fixed cylinder 6 and the slide 30 carry the support surfaces 22 and 23, which are positioned orthogonally to the mandrel axis and which are provided for the axial retaining of segments 11 and 20 during their radial movement, as will be apparent from the subsequent description.

The fixed cylinder 6, which carries the first shaping surface 34 is provided with an annular passage 18 in order to receive a heat-transferring liquid which is supplied or removed by two lines 24. These lines run parallel to the mandrel axis, pass between the retractable segments and also through bores 50, 51 and 52 which are provided in the fixed cylinder 6, slide 30 and flange 16, as is apparent from FIGS. 4 and 5.

Figure 4:
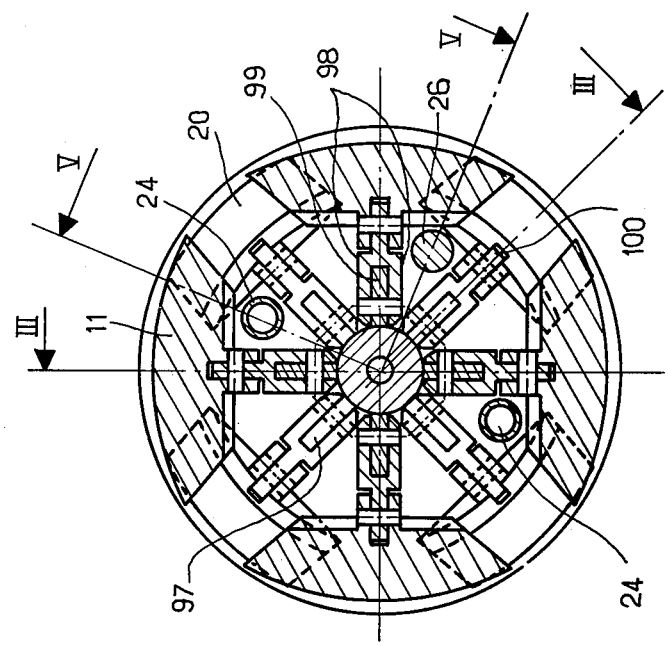
FIG. 4 shows a section along the line IV—IV of FIG. 3.
Figure 5:
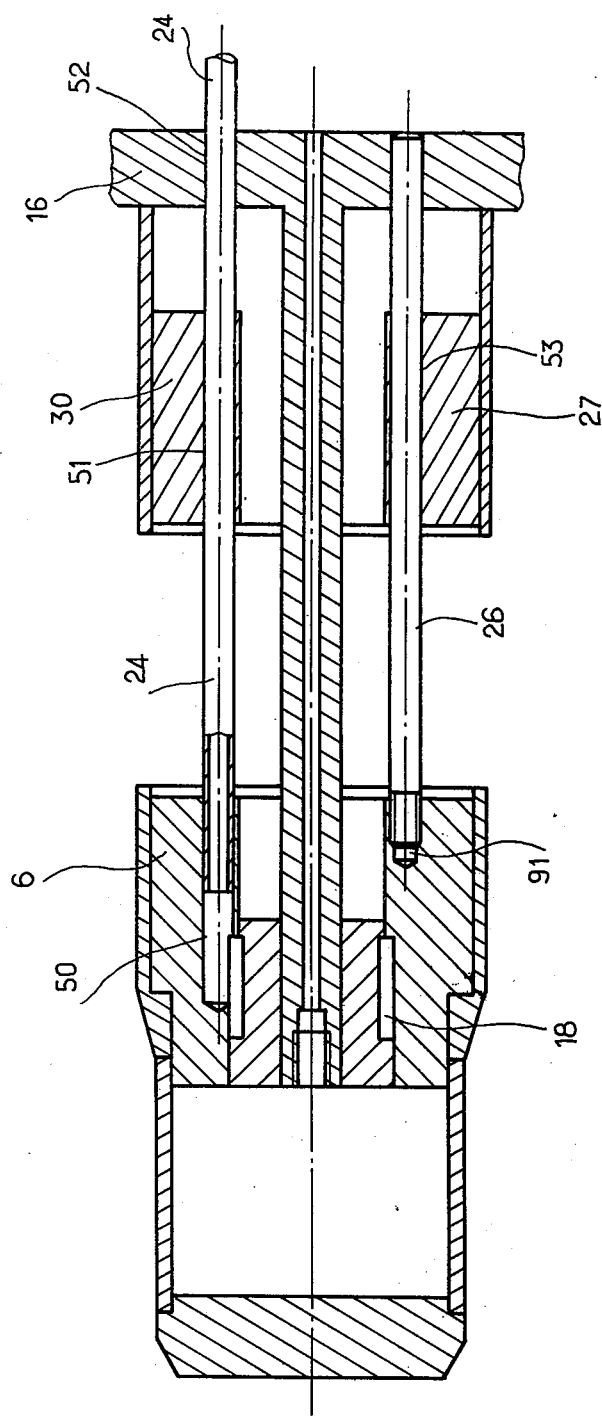
FIG. 5 shows the mandrel according to FIGS. 1 and 2 in section along the line V—V of FIG. 4.

A guide rod also shown in FIGS. 4 and 5 runs parallel to the mandrel axis and one of its ends 91 is connected to cylinder 6 and its other end is connected to the flange 16, being freely received by a bore 53 of slide 30.

Figure 3:
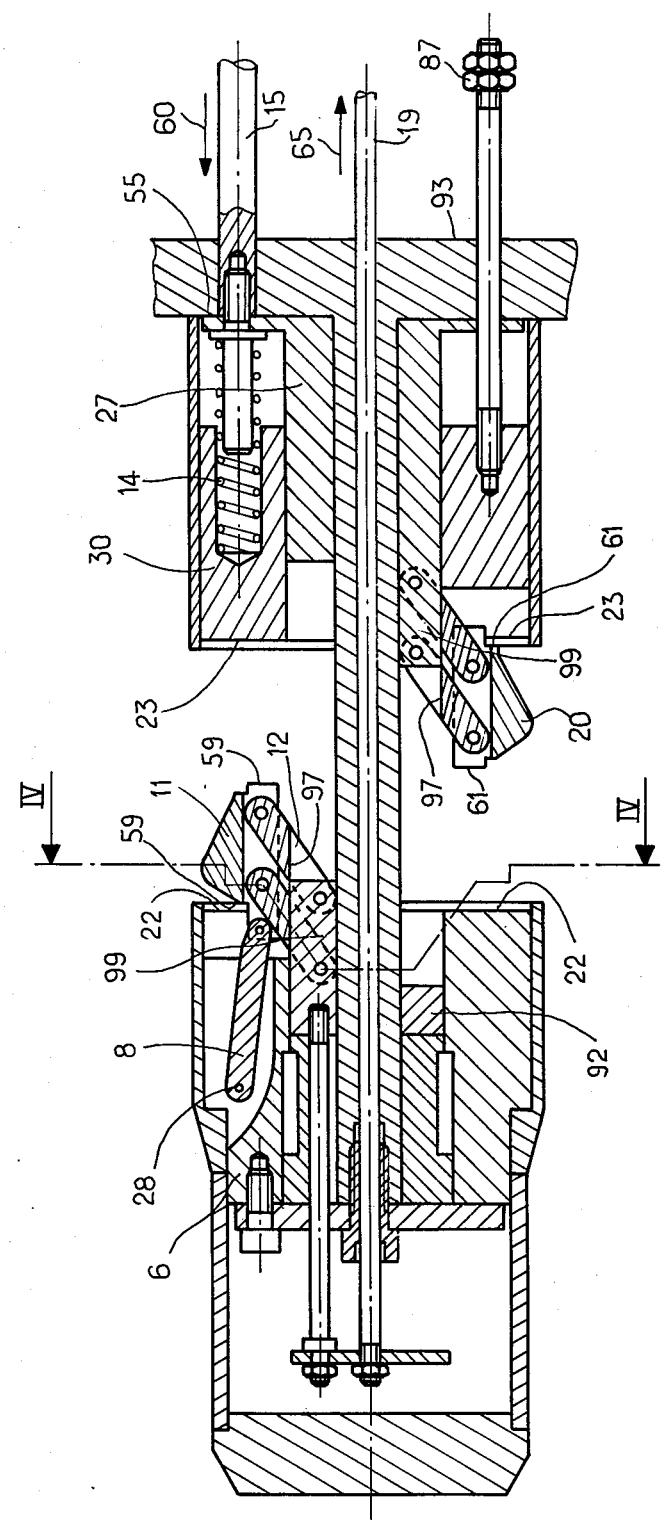
FIG. 3 shows a section along the line III—III of FIG. 4 showing the mandrel of FIG. 1 with retractable segments in the retracted position.

FIG. 3 shows a mandrel with the segments in the retracted position in which, with respect to the position of FIG. 1, the first actuating bush 9 has been positioned internally with respect to the first shaping surface 34 in the direction of the cover plate 1 of the mandrel. This first actuating bush 9 is received internally in a bore 92 provided in the fixed cylinder 6 and the second actuating bush 27 has been moved in the opposite direction until its shoulder 42 engages with the surface 55 of flange 16. A further joint or link 8, is on the one hand pivotably mounted on the pin 56 on each segment 11; on the other hand on he pin 28 on the fixed cylinder 6 further joint 8 is pivotable in the plane of the two parallel joints 12 and in a direction parallel to the mandrel axis. This arrangement ensures the axial maintenance of the retractable segments 11 in the retracted position.

According to the present embodiment of the invention, joints 12 and 36 comprise fork members whose arms 98 (FIGS. 2 and 4) are arranged on either side of tongues 99 formed by the opposite ends of the actuating bushes 9 and 27 and mounted by means of pins 38 and 39. The end 100 thereof receives a pin 10 or 37.

The surface 97 (FIG. 3) at the junction of arms 98 is constructed in such a way that an abutment which limits the radial retraction of segments 11 and 20 is formed by the mounting on the radial surface of the tongues 99.

In order to bring about the movement of the retractable segments from the position shown in FIG. 3, the central actuating rod is firstly actuated in the direction opposite to guide sleeve 2, as indicated by arrow 65. The first actuating bush 9 then moves in the same direction, which leads to the extension of segments 11, which together with the first actuating bush 9 and the two parallel joints 36 form a deformable parallelogram and are axially retained by the joint 8.

In a second phase a force is exerted in the direction of guide sleeve 2 in accordance with arrow 60 on the offset rod 15, which brings about the displacement of the second actuating bush 27 in the direction of mandrel end 1. The slide 30 then accompanies this movement due to the action of compression spring 14. When nuts 87 of the stroke limiting rod 21 abut against the wall 93 of flange 16, stops 59 and 61 of segments 11 and 20 engage gently with the support surface 22 or 23. The force in the direction of arrow 60 on rod 15 then acts further and spring 14 is compressed, which permits the second actuating bush 27 to move further in the direction of arrow 60, leading to the radial extension of segments 20 which are held axially by support surfaces 22 and 23.

The retraction of the mandrel segments according to the present invention from the position shown in FIG. 1 is also performed in two phases.

Firstly a force is exerted on rod 15 in accordance with arrow 66 in the opposite direction to the guide sleeve and this leads to the relaxing of spring 14 which holds the slide 30 in position, while the second actuating bush 27 moves in the direction of arrow 66, which initially leads to the radial retraction of the retractable segments 20. When spring 14 is relaxed the slide 30 is in turn brought against flange 16 and is carried along by the axial movement of segments 20 which are supported on the surface 23 of slide 30.

It is then merely necessary to move the central actuating rod 19 in the direction of the guide sleeve 2, i.e. in the direction of the arrow 70 in order to bring about the radial retraction of segments 11.

It is readily apparent that the joints 8 could be replaced by equivalent means, e.g. springs arranged in such a way that the retractable segments 11 are axially retained.

Furthermore the second shaping surface 44 has been described as "fixed with the slide 30", but said members could also be constructed so as to slide on one another and be separately actuated. For example the second shaping surface 44 can be connected in fixed manner with flange 16, while slide 30 is displaceably arranged within said surface. The retractable segments 20 in the retracted position are then located inside the second shaping surface 44 during the axial return. In a similar manner the second shaping surface 44 could move freely on slide 30 in order to cover the segments in the retracted position and in order in this position to form a direct extension of the first shaping surface 34.

In the preceding description reference has been made to at least one offset rod 15 for actuating the second actuating bush 27. In practice there will however preferably be a plurality of parallel rods uniformly distributed about the axis and which together with in each case one compression spring 14 permit an optimum distribution of the forces exerted on the displaceable parts.

It is also apparent that the construction of the mandrel with retractable segments according to the present invention permits the manufacture of sockets with reinforcing seams having a considerable "reinforcing seam depth/pipe diameter" ratio, as an extension of the seam depth corresponds to an extension of the radial movement of the segments. Such an extension can be simply realized by increasing the axial movement of the actuating bushes and lengthening the parallel, axially displaced joints. Contrary to the known mandrels, these changes only lead to a relatively small increase in the size of the actuating means and therefore considerably improves the above mentioned ratio.

Furthermore, since all the actuating means, with the exception of the joints, are moved in a purely axial manner, it is easy to supply and remove a temperature-transferring liquid through pipes passing through bores in the fixed or only axially moving members and which pass between the joints.

The mounting flange 16 makes it possible to mount the mandrel according to the present invention on all machines equipped with means for actuating the ends of actuating rods 15 or 19 and which project from the wall 93 of flange 16, whereby this takes place in one of the sequences indicated hereinafter:

Return of the central actuating rod 19, followed by the insertion of at least one offset rod 15 to bring about the display of the retractable segments.

Return of at least one rod 15, followed by the insertion of the central actuating rod 19 to bring about the insertion of the retractable segments.

These actuating means are preferably hydraulic cylinders or compressed air cylinders.

As a varient it is possible to provide for the electrical heating of the mandrel by means of an annular heating resistor located in the passage 18 of fixed cylinder 6 and which receives the power supply through lines 24.

What is claimed is:

1. A mandrel with at least two shaping cylindrical surfaces, successively arranged in axial extension of one another between the free mandrel end and a mounting flange, comprising a first and a second row of moveable segments which can assume a first extended position in which the radially outer surface of the segments associated alternately with the different rows in the peripheral direction form a continuous torus which separates the two cylindrical shaping surfaces from one another, and which can assume a second retracted position in which the distance from the radially outer surface thereof to the axis is smaller than the radius of the cylindrical shaping surfaces and the segments of one row can be axially displaced with respect to those of the other row, further comprising actuating means for bringing about the extension and retraction movements, wherein said actuating means comprises a first and a second bush which are arranged in axially moveable manner within the first and the second shaping surfaces respectively and on which the segments of the first and second rows of segments are pivotably mounted by means of two parallel, axially displaced joints, and wherein orthogonal support surfaces are provided for the axial retaining of the segments during their radial movement together with means for displacing the first and the second bush respectively.

2. A mandrel according to claim 1, wherein the first shaping surface is carried by a cylinder fixed between the free mandrel end and the segments, the second shaping surface is carried by a slide which is constructed so as to slide on the second actuating bush, a spring under pressure between the slide and the second actuating bush forces (a) the slide in the direction of the first shaping surface and (b) the second actuating bush in the opposite direction, a limiting means is provided for limiting the movement of the slide in the direction of the first shaping surface and said support surfaces are formed on the facing surfaces of cylinder and slide.

3. A mandrel according to claim 2, wherein the limiting means comprise a rod arranged parallel to the mandrel axis and whose one end is connected in fixed manner to slide and whose other end has a thread, passes freely through a bore on the mounting flange and carries a nut and lock nut for adjustment purposes.

4. A mandrel according to claim 1 wherein the first and second actuating bush are mounted on the same shaft which is connected in fixed manner to the mounting flange.

5. A mandrel according to claim 4, wherein the actuating means of the first actuating bush is a central actuating rod which can be axially displaced in a bore of central shaft and flange, having an end opposite to the end which projects from the flange which is connected to one of the ends of a transmission rod, whose second end is connected to the first actuating bush, the actuating means of the second actuating bush comprising at least one offset rod which is axially displaceable in flange which has an end opposite to the end projecting from flange which is connected to the second actuating bush.

6. A mandrel according to claim 2, wherein each of the retractable segments of the first row is axially held in the retracted position by means of a further joint which is pivotably mounted on both a segment and the cylinder carrying the first shaping surface, whereby said further joint can be pivoted in a direction which is parallel to the mandrel axis in the plane of the two parallel joints.

7. A mandrel according to claim 2, wherein at least one guide rod which is parallel to the mandrel axis and has an end which is connected to the cylinder carrying the first shaping surface and a second end which is connected to the mounting flange, said rod being freely received by the corresponding bore of slide.

8. A mandrel according to claim 2, wherein the cylinder carrying the first shaping surface also has an internal annular passage for receiving a heating means supplied by lines which are parallel to the mandrel axis and pass between the segments, and by ducts which pass through corresponding bores of cylinder slide and flange.

9. A mandrel according to claim 2, wherein the second shaping surface is connected in fixed manner with the mounting flange and the slide can be displaced within said surface.

10. A mandrel according to claim 2, wherein the second shaping surface moves freely on the slide to cover the segments in the retracted position in order in this way to form a direct extension of the first surface.

11. A mandrel according to claim 1, wherein a third cylindrical shaping surface is provided on its free end, the diameter of said third shaping surface being smaller than that of the first and second shaping surfaces.

12. A shaping machine, comprising a mandrel according to claim 5 and having means for actuating the end of the central actuating rod and at least one offset rod which projects from the side of the flange opposite to the mandrel.

13. A shaping machine according to claim 12, wherein the rod actuating means are hydraulic cylinders or compressed air cylinders.

* * * * *